(12) United States Patent
Carteau

(10) Patent No.: US 6,459,571 B1
(45) Date of Patent: Oct. 1, 2002

(54) PACKAGING SYSTEM FOR MASS MEMORY UNITS

(75) Inventor: Daniel Carteau, Phoenix, AZ (US)

(73) Assignee: Bull HN Information Systems Inc., Billerica, MA (US)

( * ) Notice: Subject to any disclaimer, the term of this patent is extended or adjusted under 35 U.S.C. 154(b) by 13 days.

(21) Appl. No.: 09/594,943

(22) Filed: Jun. 15, 2000

(51) Int. Cl.[7] ................................................. G06F 1/16
(52) U.S. Cl. ........................ 361/684; 361/683; 361/685; 312/35; 312/36
(58) Field of Search ......................... 361/679, 683–687; 312/9.1, 9.9, 35, 36, 42, 249.1, 249.4, 294, 321, 330.1; 364/708, 708.1

(56) References Cited

U.S. PATENT DOCUMENTS 5,877,938 A * 3/1999 Hobbs et al. ............... 361/724

* cited by examiner

Primary Examiner—Darren Schuberg
Assistant Examiner—Yean-Hsi Chang
(74) Attorney, Agent, or Firm—James H. Phillips; B. E. Hayden

(57) ABSTRACT

A mass memory storage unit includes a cabinet and one or more drawers incorporated into the cabinet. Each drawer is movable between closed and open positions to permit access to the interior for service. Inside each drawer, there is a connector plane disposed generally to one side of the drawer interior and parallel to the direction of travel between the closed and open positions. The connector plane incorporates connectors for receiving storage devices (for example, hard disk drives), each incorporating a connector which detachably mates with one of the connectors on the connector plane. Support and interface devices are coupled to the connector plane by suitable complementary connectors. It is useful to provide a cable, which itself may be detachable from the connector plane, to establish a redundant connection such that the devices in a drawer remain in-circuit when that drawer is opened for access to the enclosed components.

13 Claims, 9 Drawing Sheets

PACKAGING SYSTEM FOR MASS MEMORY UNITS

FIELD OF THE INVENTION

This invention relates to the efficient packaging of mass memory units (such as hard disk drive arrays) and, more particularly, to a mass memory unit incorporating a cabinet with one or more drawers which can be individually opened to provide access to a vertically disposed array of mass storage devices.

BACKGROUND OF THE INVENTION

Large scale computer systems incorporate banks of mass storage units such as arrays of hard disk drives. In the prior art mass storage units, disk drives in servers or disk subsystems are usually packaged in canisters which permit manipulation of the disk drives including the support of hot plug/unplug functions. The canisters each have a connector adapted to engage a complementarily configured connector on a backplane or a midplane which includes printed circuit traces conventionally interfacing the disc drives with system circuitry. Each canister is individually shielded to limit RFI/EMI radiation to within required minimum levels. Alternatively, a shielded door is used to enclose a bank of canisters. If no active canister is plugged into any available position, it is necessary to insert a dummy canister into that position in order to maintain acceptable radiation levels and also to prevent disturbance of the cooling airflow pattern.

Users of large scale computer systems wish, on an ongoing basis, to have access to mass storage units with features which exceed the capabilities and potential of the prior art mass storage units. Among these desired features is packaging which anticipates technology evolution and which offers very high reliability and high availability at relatively low cost. More particularly, what is desired is a mass storage unit with high reliability specifications, a high storage capacity per cubic meter, excellent cooling airflow management, technology anticipation, ready functional integration with available controllers, modularity, accommodation of disk drives having different form factors and excellent compliance with RFI/EMI regulations, all at a competitive price. The present invention is directed to a mass storage unit which achieves all these aims and provides still further advantages.

SUMMARY OF THE INVENTION

Briefly, these and other aims of the invention are achieved by a mass memory storage unit which includes a cabinet and one or more drawers incorporated into the cabinet. Each drawer is movable between closed and open positions to permit access to the interior for service. Inside each drawer, there is a connector plane disposed generally to one side of the drawer interior and parallel to the direction of travel between the closed and open positions. The connector plane incorporates a plurality of connectors for receiving storage devices (for example, hard disk drives), each incorporating a connector complementarily configured to mate with one of the connectors on the connector plane. Thus, each storage device is individually removable. Support and interface devices are coupled to the connector plane by suitable complementary connectors. It is useful to provide a cable, which itself may be detachable from the connector plane, to establish a redundant connection such that the devices in a drawer remain in-circuit when that drawer is opened for access to the enclosed components.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DESCRIPTION OF THE PREFERRED EMBODIMENT(S)

Figure 1:
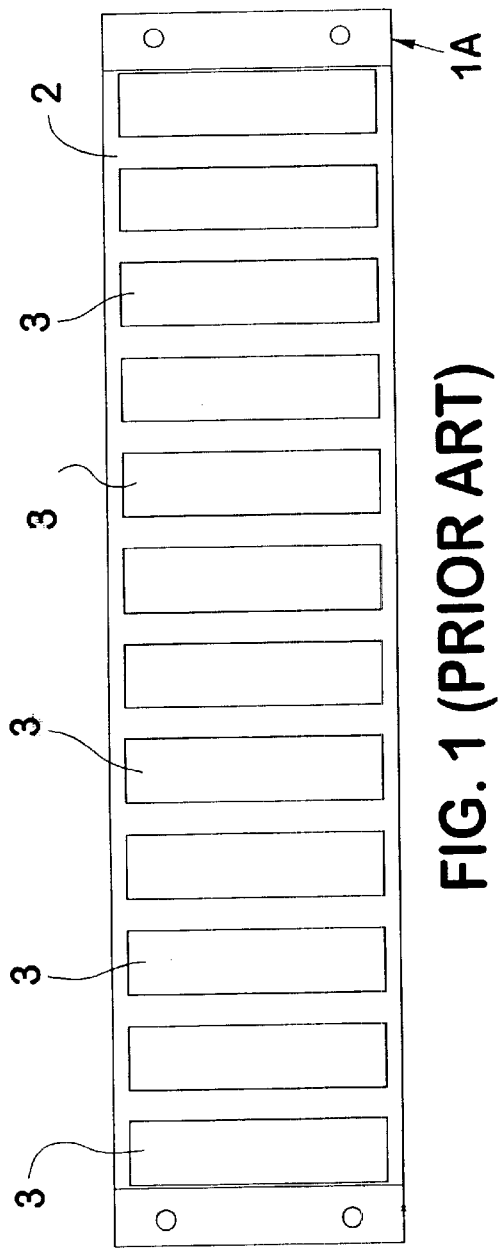
FIG. 1 is an example of a prior art mass storage unit employing disk drive canisters in a first form factor.
Figure 2:
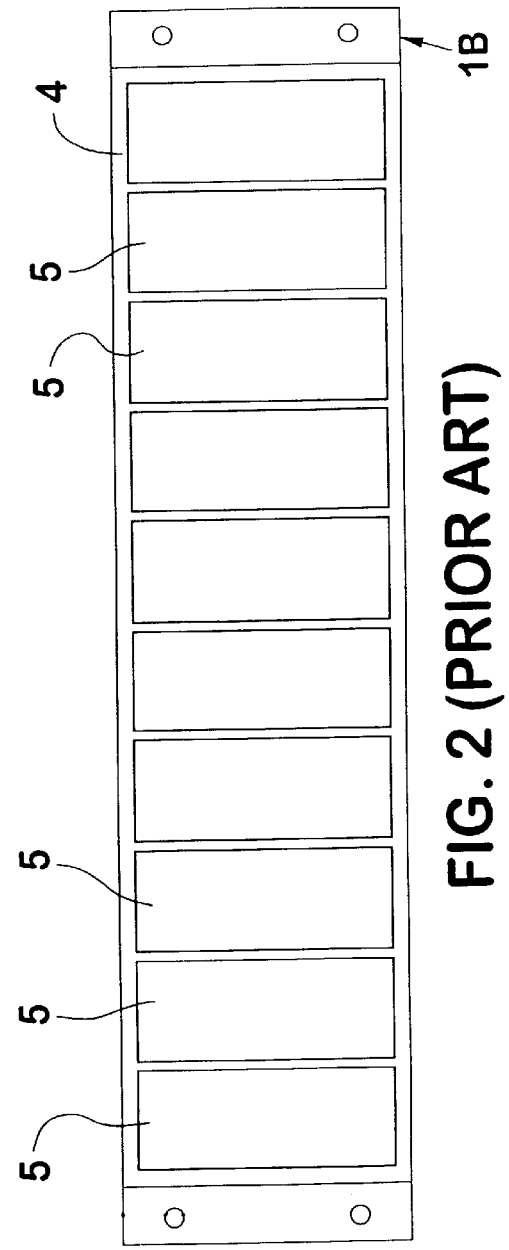
FIG. 2 is an example of a second prior art mass storage unit employing disk drive canisters in a second form factor.

FIGS. 1 and 2 illustrate exemplary prior art mass storage units including a nineteen inch rack mount 1A, 1B incorporating, respectively, 1.0 inch form factor disk drive canisters 3 plugged into a printed circuit midplane 2 and 1.6 inch form factor disk drive canisters 5 plugged into a printed circuit midplane 4.

Figure 3:
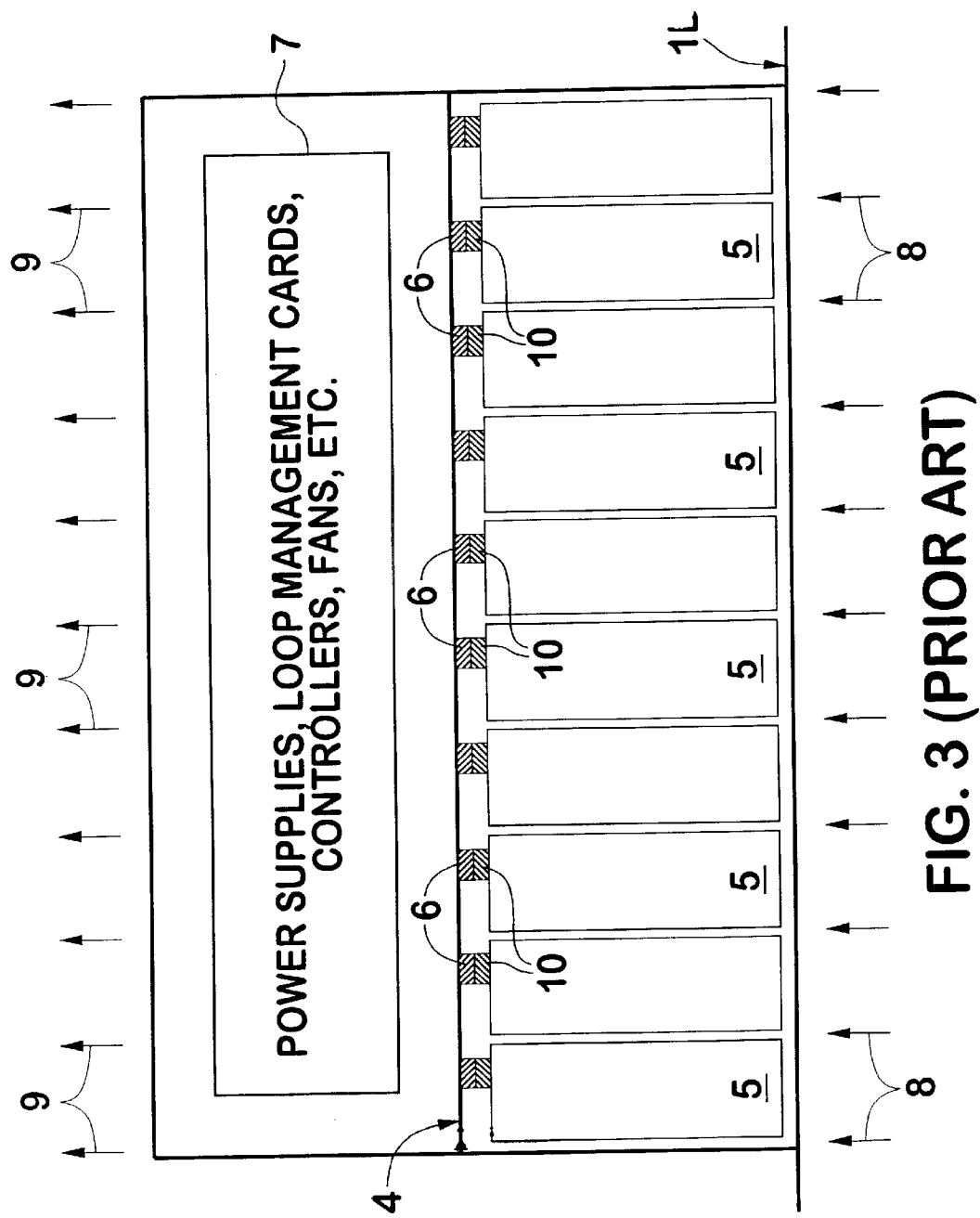
FIG. 3 is a top view of the prior art mass storage unit shown in FIG. 2.

FIG. 3 is an interior top view of the exemplary prior art mass storage unit shown in FIG. 2. Integral canister connectors 10 are disposed to mate with complementarily configured connectors 6 on the midplane 4 in order to electrically couple each disk drive canister into a server, disk drive subsystem or other mass storage subsystem in the well known manner.

Because the midplane 4 obstructs the airflow represented by arrows 8, 9, a number of holes (not shown) must be made in the midplane to allow forced ventilation in order to cool the canisters 5 and, particularly, to cool the support components included in the block 7 and situated behind the midplane. But this solution is a flawed compromise because the holes through the midplane cannot be as numerous or as large as needed without unacceptably interfering with the printed circuit pattern and the physical strength of the midplane. Thus, the prior art mass storage units experience mediocre cooling with adverse impact on the reliability of their disk drives, their midplanes and their support components and circuitry.

In addition, a defective midplane cannot be changed out without taking the entire mass storage unit offline and extracting the mass storage assembly from its cabinet. Often, this operation can only be achieved through a full chassis exchange. It should be noted that, even if a midplane is completely passive (i.e., no active components soldered on it), which is not always the case, the need to change a midplane on site is not at all equal to zero due to the very high number of connectors supported. The impact on high availability of a connector plane is notoriously well known in the art.

Figure 4:
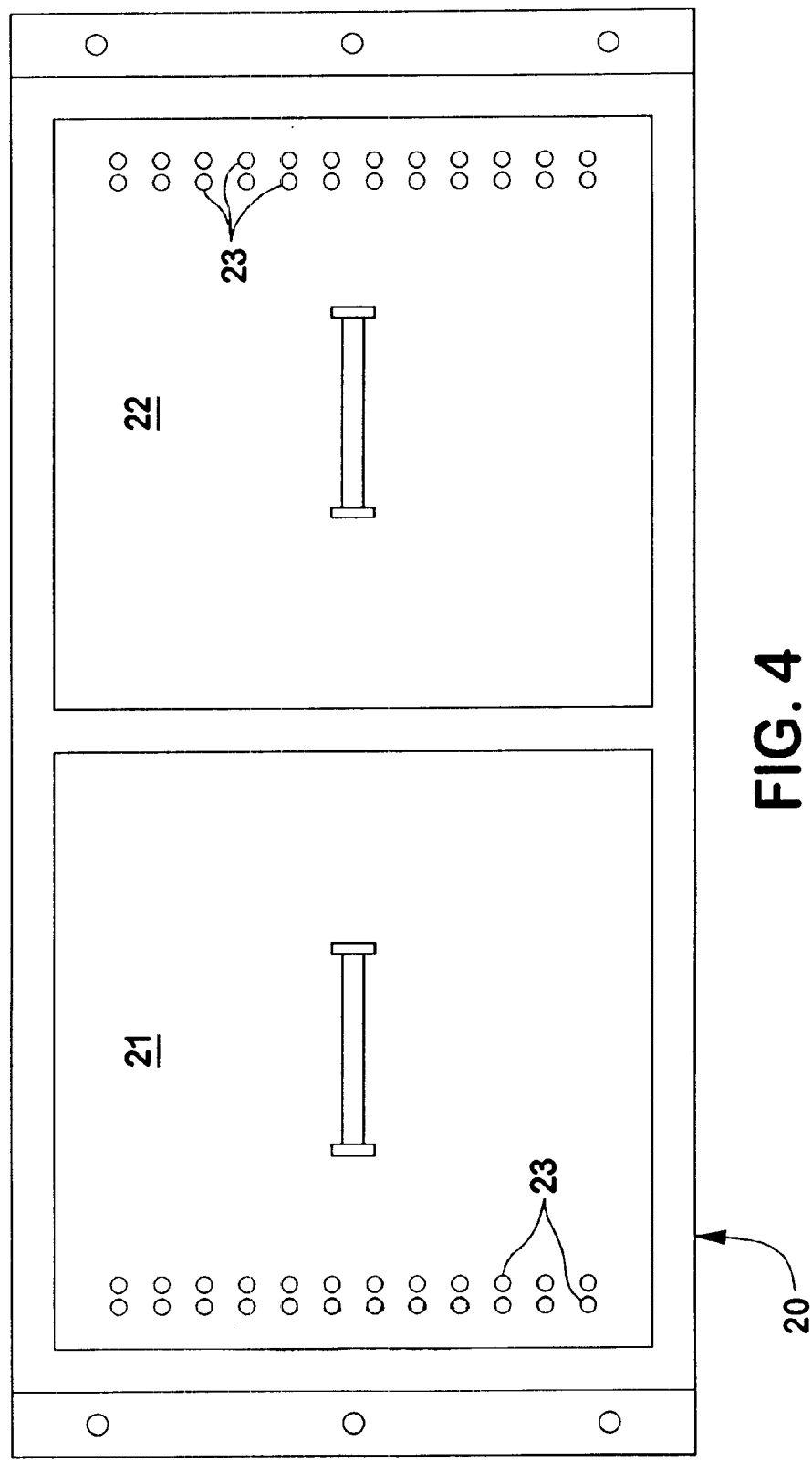
FIG. 4 is a front view of an exemplary mass storage unit according to the present invention and incorporating two drawers.

FIG. 4 is a front view showing an exemplary mass storage unit according to the present invention and including a cabinet 20 having two drawers 21 and 22. Banks of LEDs 23 (or lightpipes illuminated by LEDs) are provided on the front faces of the drawers 21, 22 to indicate the status and activity of hard drives contained within the cabinet 20.

Figure 5:
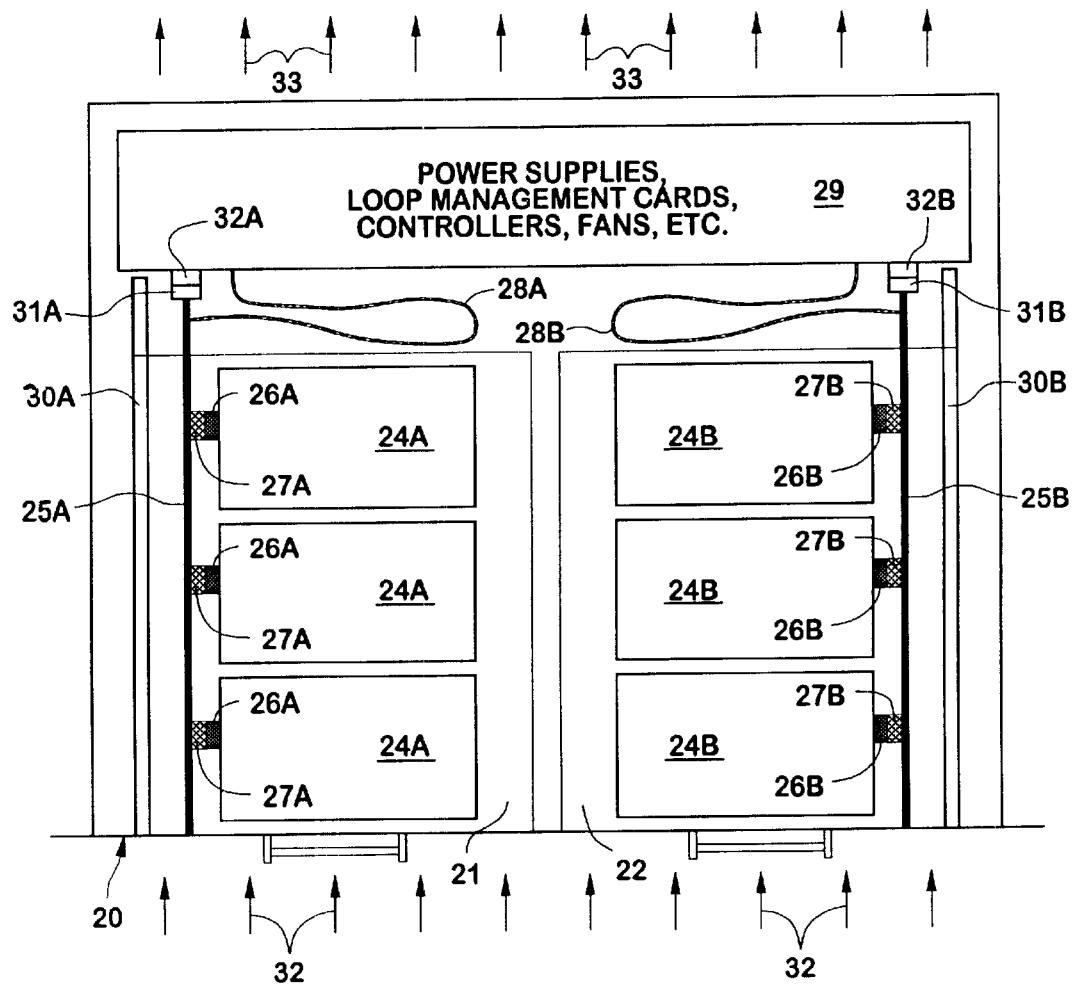
FIG. 5 an interior top view of the exemplary mass storage unit shown in FIG. 4.

Referring now to FIG. 5, the interior structure (i.e., with the top of the cabinet 20 omitted to provide clarity in explaining the invention) of the exemplary mass storage unit is shown in a top view. Two arrays of disk drive canisters 24A, 24B are respectively disposed in the drawers 21, 22. While the top three disk drives are shown in each of the arrays, it will become evident below that additional rows of disk drive canisters 24A, 24B are situated below those in view in FIG. 5. Drawer rails 30A support the drawer 21 in the cabinet 20; similarly, drawer rails 30B support the drawer 22; thus, each of the drawers 21, 22 can be independently opened for access to the disk drive canisters 24A, 24B for service, hot swaps, etc.

The disk drive canisters 24A, 24B respectively plug into sideplanes 25A, 25B. Each of the sideplanes 25A, 25B mounts an array of connectors 27A, 27B configured to operatively couple with connectors 26A, 26B integral with each disk drive. In the example, connectors 31A, 32A and 31B, 32B couple the midplanes 25A, 25B, and hence the disk drive canisters 24A, 24B, to support circuitry and devices represented by the block 29. In addition, redundant coupling between the midplanes 25, 25B and the block 29 is provided by cables 28A, 28B.

Arrows 32, 33 represent airflow through the cabinet by the use of conventional fans (not shown in detail), and it will be particularly observed that the airflow is generally parallel to the planes of the sideplanes 25A, 25B. Therefore, it will be appreciated that a major drawback of the prior art, the necessity to provide apertures in the connector planes receiving disk drive arrays resulting in the aforementioned drawbacks. Accordingly, cooling of the components of the mass storage unit is very much improved over the prior art mass storage units.

Figures 6, 6A:
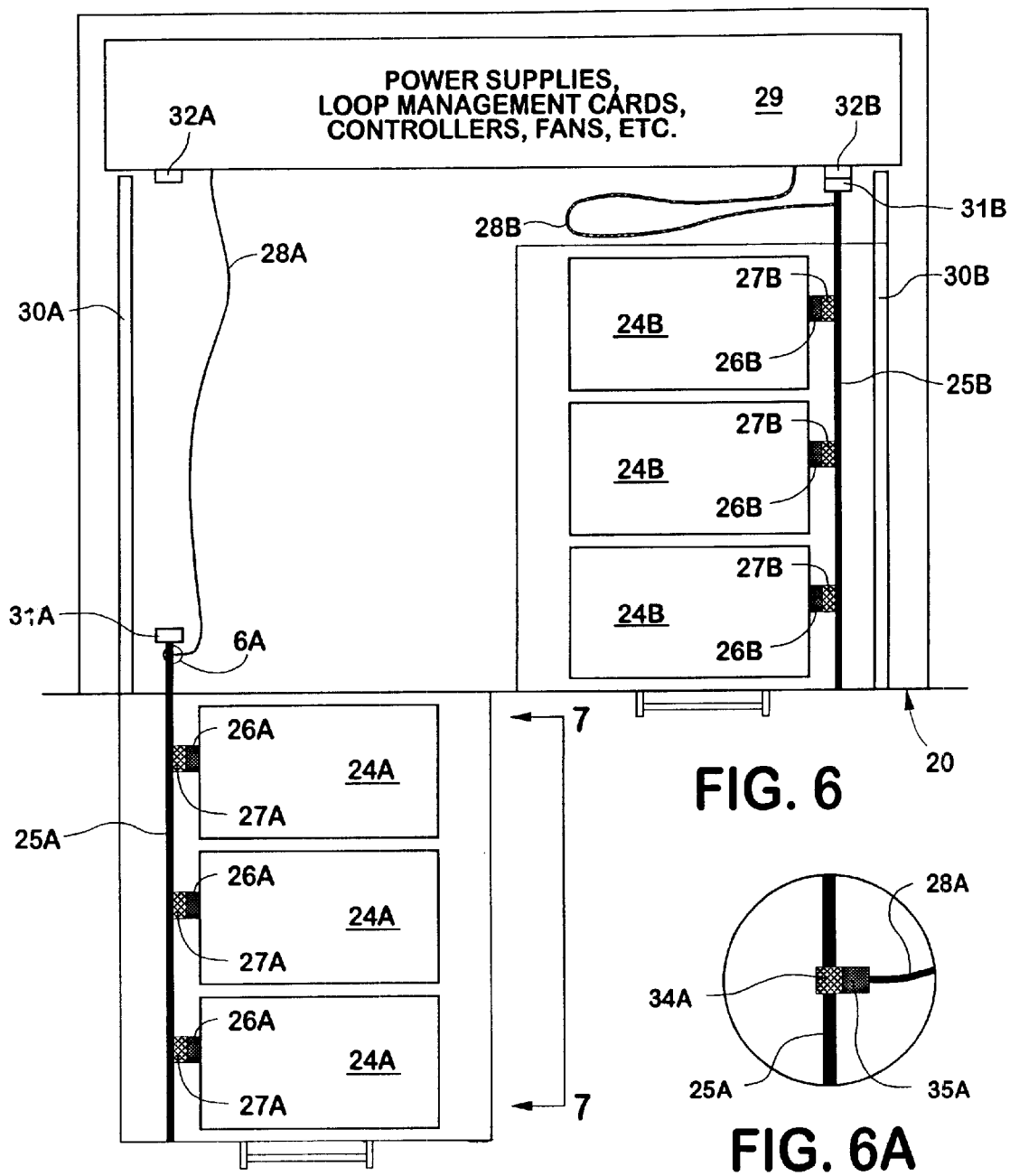
FIG. 6 is a view similar to FIG. 5 illustrating a drawer incorporating a plurality of disk drives pulled out for access to the disk drives and associated components.
FIG. 6A is an enlarged view of the region 6A in FIG. 6.

FIG. 6 illustrates the exemplary mass storage unit with the drawer 21 drawn from the cabinet 20 which results in the decoupling of connectors 31A, 32A. The cable 28A terminates at the sideplane 25A in the region 6A. As shown in FIG. 6A, the cable 28A includes a connector 35A which detachable couples to a connector 34A on the sideplane 25A. Those skilled in the art will understand that, while the connectors 31A, 32A (and 32A, 32B) provide more reliable coupling during normal operation, the provision of the redundant coupling through the cables 28A, 28B permits ongoing operation while a drawer is opened for maintenance or any other reason which requires access to the components disposed in a drawer.

Figure 7:
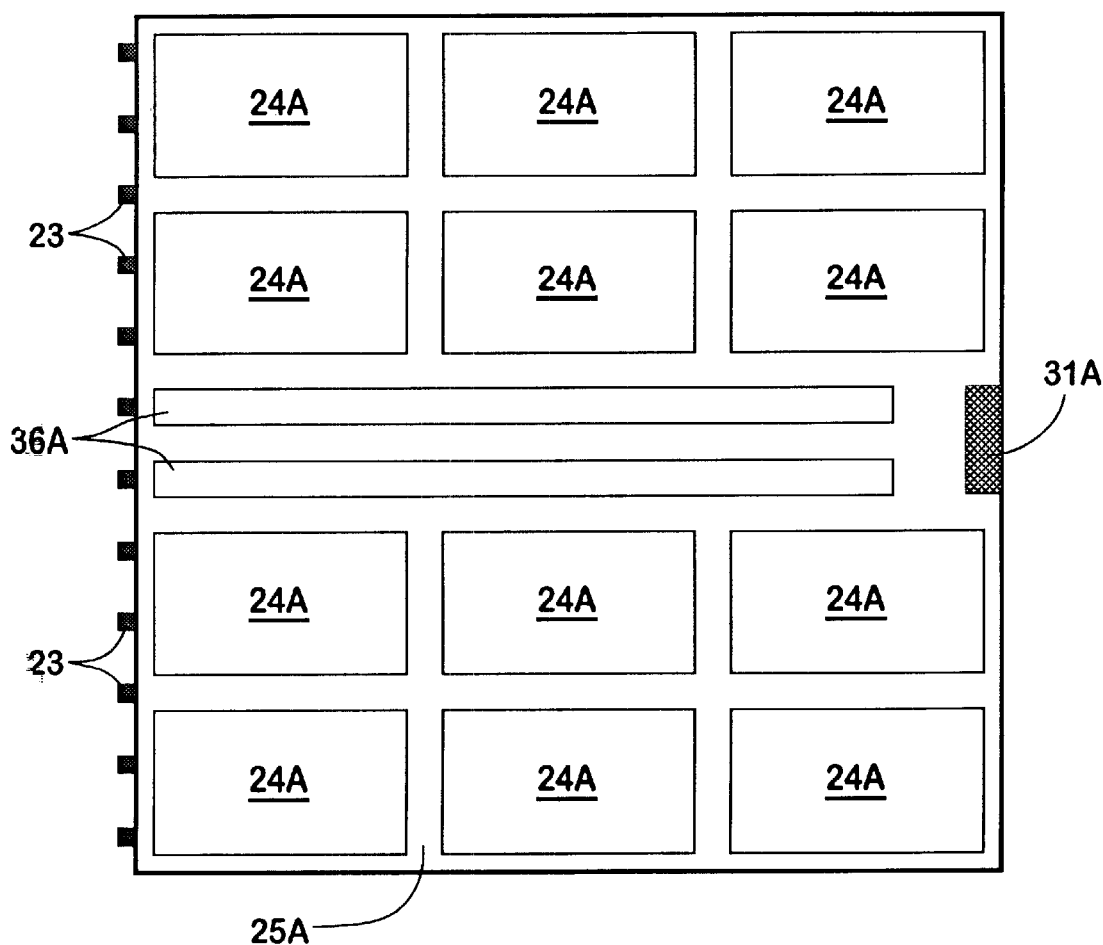
FIG. 7 is a view taken along the lines 7—7 of FIG. 6.

Arrows 7—7 in FIG. 6 indicate a side view shown in FIG. 7. Thus, with reference to FIG. 7, a first configuration of a disk drive canister array disposed within the drawer 21 is depicted. In this configuration, twelve disk drive canisters 24A of a first form factor (e.g. 1.6 inch) are divided into upper and lower groups of six. The board-to-cable connector 34A and a pair of disk management boards 36A are disposed between upper and lower groups. Alternatively, as well known in the art, the conductors at the connector plane end of the cable 28A may be soldered or otherwise directly connected to the sideplane 25A with a detachable connector (not shown) provided at the remote cable end which interfaces with the circuitry and devices represented by the block 29.

The disk management boards 36A typically incorporate special purpose support circuitry which is preferably placed between the circuitry of the disk drive canisters 24A and circuitry in the block 29. For example, if the well known FC-AL (Fiber Channel Arbitrated Loop) disk drive architecture is used, the two disk management boards 36A carry the redundant circuitry which performs all the logical services necessary to rationalize and secure failsafe operation if there are empty disk drive canister positions or a disk. drive canister fails.

Figure 8:
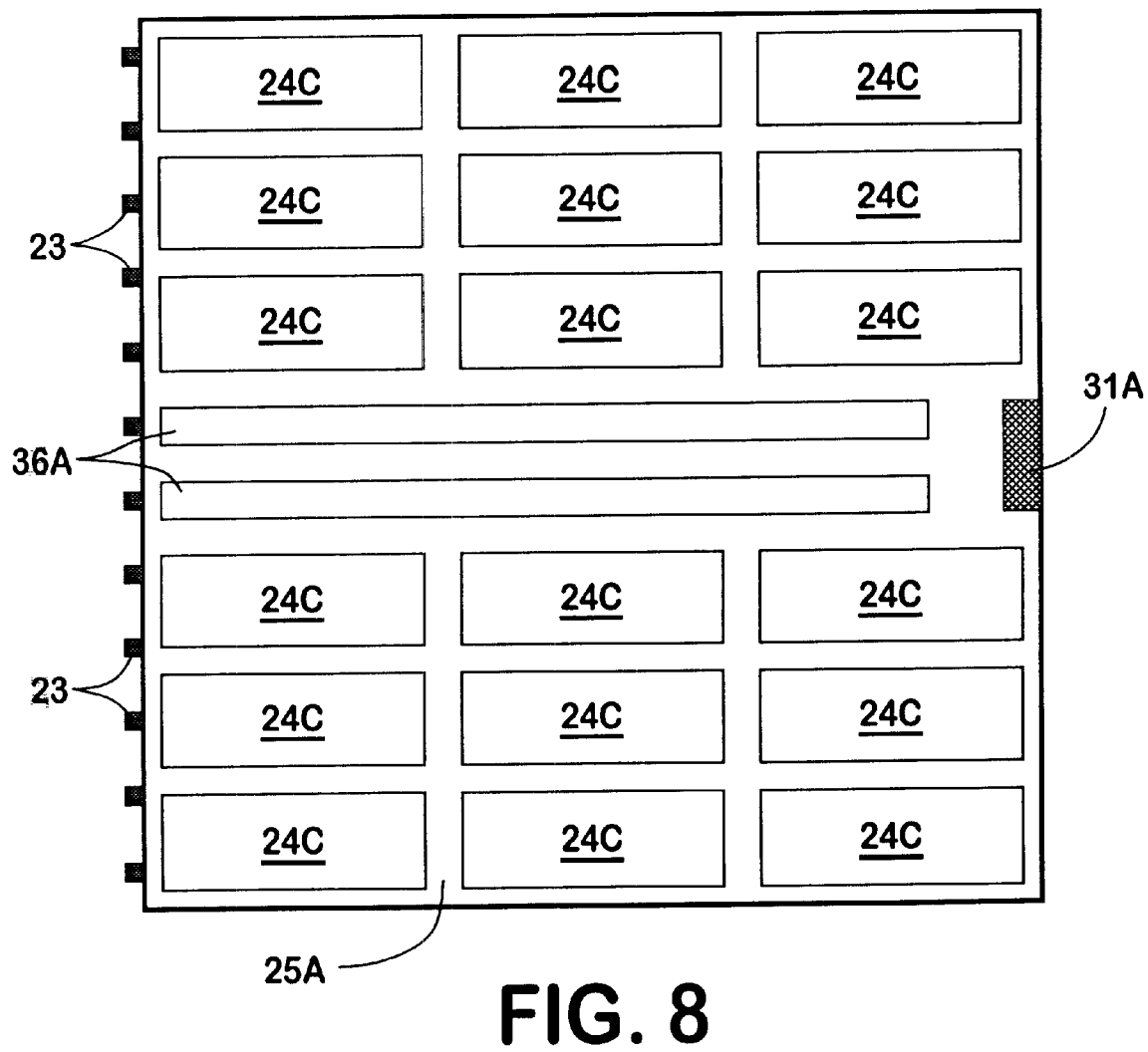
FIG. 8 is a view similar to FIG. 8 illustrting the manner in which disk drives with a different (smaller in the example) form factor may be used in the invention.

FIG. 8 is similar to FIG. 7, but shows eighteen disk drive canisters 24C of a second form factor (e.g. 1.0 inch) smaller than the first form factor and divided into upper and lower groups of nine with the board-to-cable connector 34A and the pair of disk management boards 36A disposed between the upper and lower groups.

Those skilled in the art will understand that provision for mixing disk drives of different form factors on a single connector plane typically is carried out by spacing the disk drive coupling connectors to accommodate the larger form factor disk drives such that the smaller form factor disk drives cannot be optimally packed; that is, if two connector are provided to accommodate a pair of larger form factor drives, then only two smaller form factor disk drives can be substituted. However, reference may be taken to copending U.S. patent application Ser. No. 09/594,942 filed on even date herewith, now U.S. Pat. No. 6,292,360, entitled PACKAGING SYSTEM FOR MASS MEMORY UNITS HAVING UNIFORM OR MIXED FORM FACTORS, and assigned to the same assignee as this invention.

Figure 9:
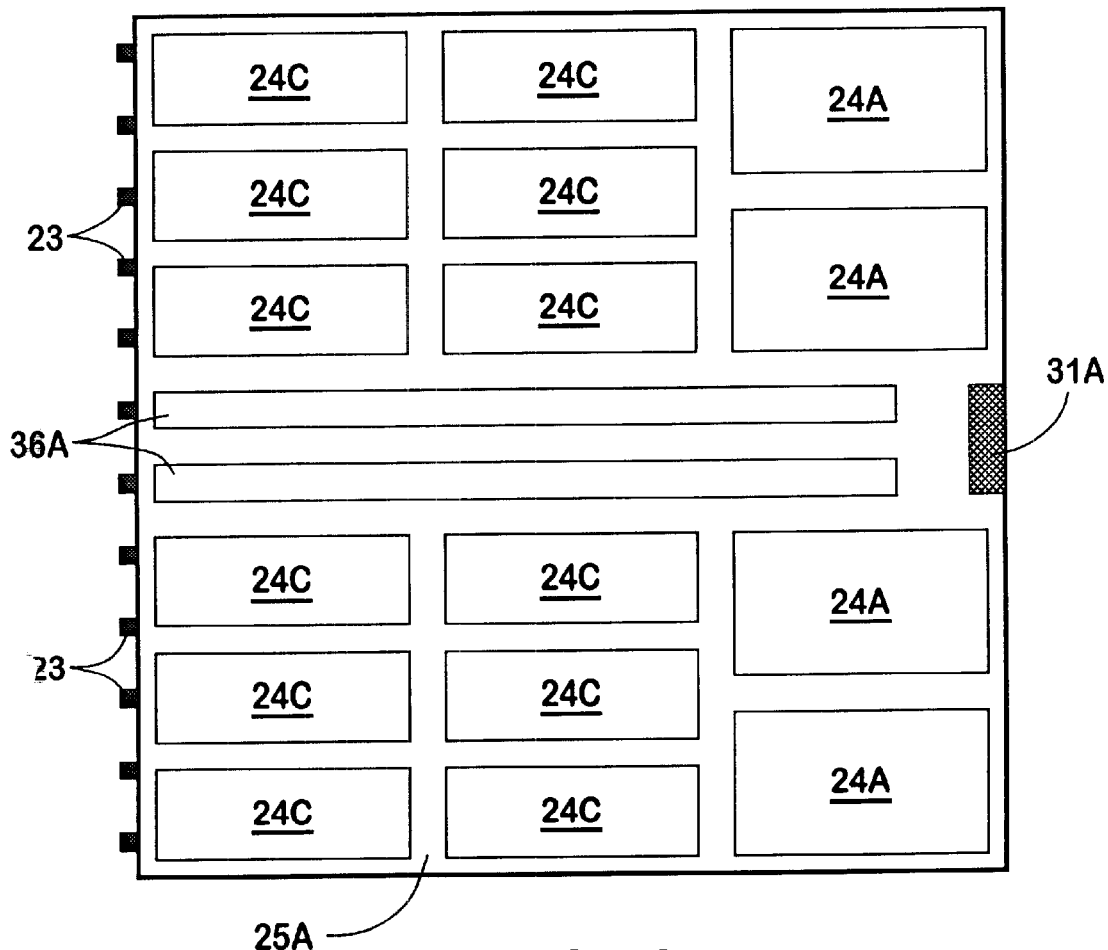
FIG. 9 is a view similar to FIGS. 7 and 8 illustrating the manner in which disk drives with different form factors can be incorporated together.

In the copending application, which is incorporated by reference herein, a connector plane configuration is disclosed and claimed which permits packing three smaller form factor disk drives into substantially the same volume as two larger form factor disk drives. The principals of the invention described and claimed in the copending application can be used to advantage in one embodiment of the present invention as shown in FIG. 9 to permit the employment of efficiently mixed form factor disk drives connecting into a single sideplane. In the example, twelve smaller form factor disk drive canisters 24C are mixed with four larger form factor disk drive canisters 24A.

It has been previously been noted that mass storage units must meet stringent RFI/EMI radiation limits and that this requirement has typically been met in the prior art by individually shielding each single disk drive canister or providing a shielded door to enclose a bank of canisters. However, the cabinet 20, including the drawers 21, 22, are made of material which serves to satisfactorily inhibit radiation when the drawers are closed, and the use of conventional construction techniques (e.g., suitable overlapping of cabinet and drawer edges, the use of radiation resistant seals, etc.) prevent radiation leaks. Because of this feature, individual disk drive canisters can be mechanically more simple which further improves cooling and reliability and, further, the individual disk drives are less costly.

Figure 10:
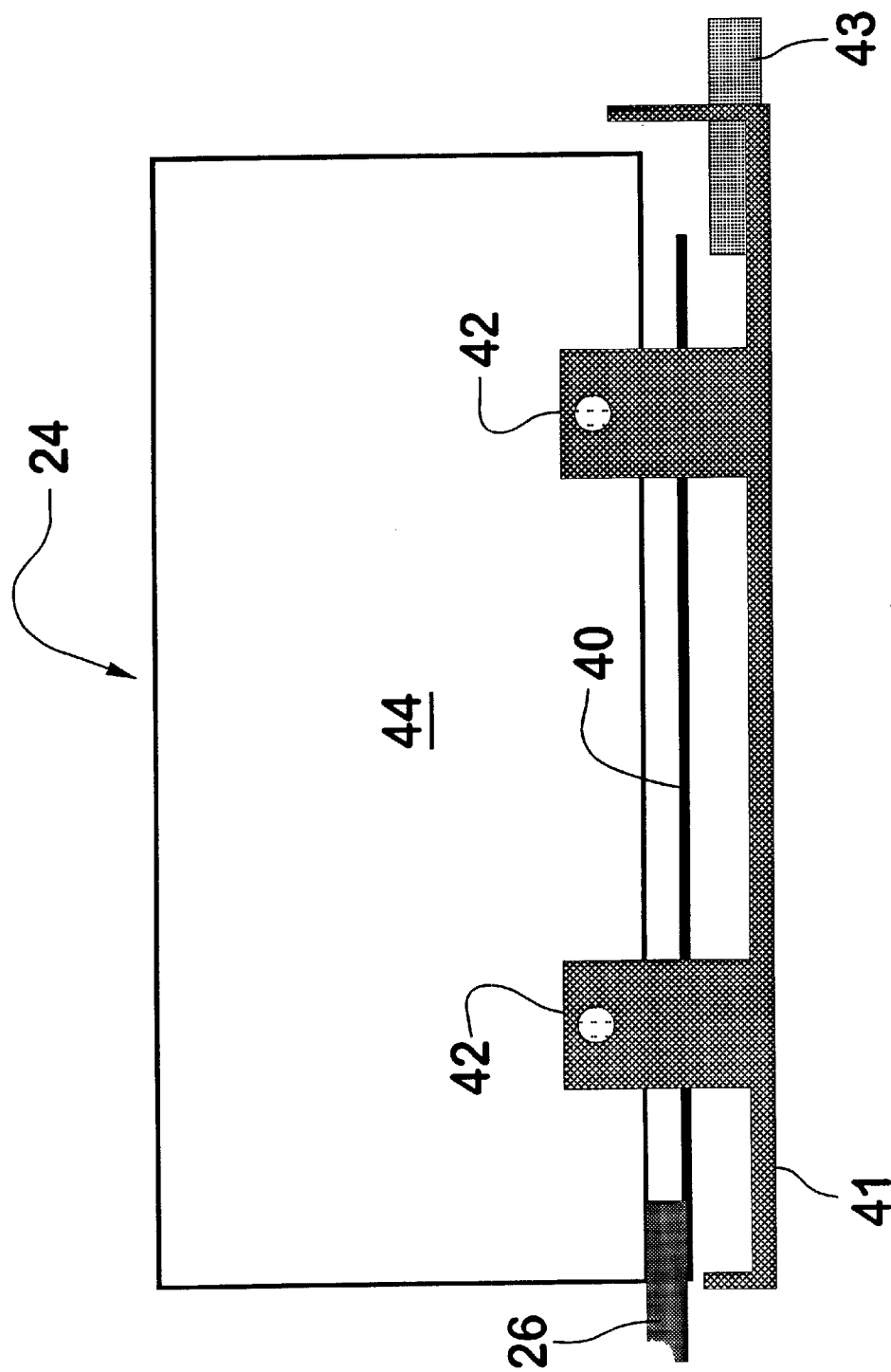
FIG. 10 is a side view of an exemplary disk drive having one presently preferred configuration use in the mass storage unit of the invention.

FIG. 10 shows, in simplified form, a disk drive canister 24 which is especially well suited for use in the subject mass memory unit. The mechanical disk drive assembly 44 is supported above and spaced from a metal base plate 41 in any suitable manner represented by brackets 42 which, for ease and economy of manufacture, are integral with the base plate. A circuit board 40, carrying electronic components specific to the disk drive canister 24 incorporates a connector 26 for coupling to a sideplane as previously described. A latch 43 serves to lock and unlock the disk drive canister 24 for insertion into or removal from the system.

The disk drive canister 24 is not encumbered by the additional components, such as RFI/EMI shielding and protective enclosures, which are found in the prior art disk drive canisters. The disk drive canister 24 is therefore not only more simple and less costly, but also is much more open for efficient cooling and airflow through the mass memory unit with which it is used. Among the most beneficial features of the invention are the achievement of a high disk drive to unit volume ratio while preserving the advantages in shielding and airflow management.

Further, it is again noted that, while disk drives of two different form factors have been used to explain the invention, the invention is not limited to the use of disk drives.

Other mass storage devices, such as compact disk drives, tape cassette drives, optical storage devices, etc. are or may become available in different, similarly proportioned, form factors, and the invention may be used to the same advantage with such diverse mass storage devices.

While a two drawer mass memory unit has been used as an example of the invention, it will be understood that a single drawer version is contemplated for smaller computer systems, and any number of drawers and multiple cabinets can be used in more extensive computer systems to provide a high degree of modularity. If an active drawer is not currently necessary for a given drawer position, an unpopulated drawer providing RFI/EMI radiation shielding can be employed in that drawer position without affecting shielding specifications or airflow management. No dummy mass storage device canisters need be used to occupy unused canister positions.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A mass memory storage unit comprising:
   A) a cabinet fabricated from a material which reduces electromagnetic and radio frequency radiation;
   B) a plurality of drawers incorporated into said cabinet, each said drawer being fabricated from a material which reduces electromagnetic and radio frequency radiation, each said drawer being movable between closed and open positions, each said drawer comprising:
      1) a connector plane disposed generally parallel to the direction of travel between said closed and open positions, said connector plane incorporating a plurality of storage device receiving first connectors;
      2) a plurality of hard disk drives, each of said hard disk drives:
         a) incorporating a second connector complementarily configured to mate with one of said storage device receiving first connectors;
         b) being removably mated with one of said storage device receiving first connectors;
         c) including a base plate and a mechanical assembly disposed in spaced-apart relationship; and
      3) support and interface devices redundantly coupled to said connector plane by a cable and by mating third and fourth connectors.

2. A mass memory storage unit comprising:
   A) a cabinet;
   B) at least one drawer incorporated into said cabinet, said drawer being movable between closed and open positions, said drawer comprising:
      1) a connector plane disposed generally parallel to the direction of travel between said closed and open positions, said connector plane incorporating a plurality of storage device receiving connectors;
      2) a plurality of storage devices, each of said storage devices:
         a) incorporating a connector complementarily configured to mate with one of said storage device receiving connectors; and
         b) being removably mated with one of said storage device receiving connectors; and
      3) support and interface devices coupled to said connector plane.

3. The mass memory storage unit of claim 2 in which said connector plane is coupled to said support and interface devices by a mating connector pair and a cable.

4. The mass storage memory unit of claim 3 in which said connector plane incorporates a cable connector and said cable incorporates a connector plane connector such that said connector plane is detachably connectable to said cable.

5. The mass storage unit of claim 4 which includes a plurality of said drawers.

6. The mass storage unit of claim 5 which includes storage devices of mixed form factors.

7. The mass storage unit of claim 4 which includes storage devices of mixed form factors.

8. The mass storage unit of claim 3 which includes a plurality of said drawers.

9. The mass storage unit of claim 8 which includes storage devices of mixed form factors.

10. The mass storage unit of claim 3 which includes storage devices of mixed form factors.

11. The mass storage unit of claim 2 which includes a plurality of said drawers.

12. The mass storage unit of claim 11 which includes storage devices of mixed form factors.

13. The mass storage unit of claim 2 which includes storage devices of mixed form factors.

* * * * *